(12) United States Patent
Sawchuk et al.

(10) Patent No.: US 7,073,534 B2
(45) Date of Patent: Jul. 11, 2006

(54) SILENCER FOR PERFORATED PLATE FLOW CONDITIONER

(76) Inventors: Blaine Darren Sawchuk, 6710 30th Street S.E., Calgary, Alberta (CA) 52C IN9; Dale Peter Sawchuk, 6710 30th Street S.E., Calgary, Alberta (CA) 52C IN9

( * ) Notice: Subject to any disclaimer, the term of this patent is extended or adjusted under 35 U.S.C. 154(b) by 0 days.

(21) Appl. No.: 10/936,832

(22) Filed: Sep. 9, 2004

(65) Prior Publication Data
US 2005/0205147 A1 Sep. 22, 2005

Related U.S. Application Data

(60) Provisional application No. 60/553,952, filed on Mar. 18, 2004.

(51) Int. Cl.
*F15D 1/00* (2006.01)
(52) U.S. Cl. .............. 138/39; 138/42; 181/264
(58) Field of Classification Search ............. 138/39, 138/42, 44, 26; 366/340; 181/264; 239/542, 239/533.1
See application file for complete search history.

(56) References Cited

U.S. PATENT DOCUMENTS

| | | | | |
|---|---|---|---|---|
| 1,844,108 A | * | 2/1932 | Smythe | 29/896.2 |
| 1,915,867 A | * | 6/1933 | Penick | 138/42 |
| 2,567,998 A | * | 9/1951 | Griffith | 138/42 |
| 3,995,664 A | * | 12/1976 | Nelson | 138/43 |
| 4,338,969 A | * | 7/1982 | Usry | 138/44 |
| 5,486,049 A | * | 1/1996 | Boatman et al. | 366/175.2 |
| 5,489,153 A | * | 2/1996 | Berner et al. | 366/337 |
| 5,606,297 A | * | 2/1997 | Phillips | 333/141 |
| 5,762,107 A | | 6/1998 | Laws | 138/144 |
| 5,937,906 A | * | 8/1999 | Kozyuk | 138/37 |
| 6,379,035 B1 | * | 4/2002 | Kubo et al. | 366/340 |
| 6,382,531 B1 | * | 5/2002 | Tracy | 239/548 |
| 6,447,158 B1 | * | 9/2002 | Farkas | 366/316 |
| 6,533,065 B1 | | 3/2003 | Zanker | 181/264 |
| 6,647,806 B1 | | 11/2003 | Estrada et al. | 73/861.28 |
| 6,701,963 B1 | | 3/2004 | Hill | 138/39 |
| 2004/0055816 A1 | * | 3/2004 | Gallagher et al. | 181/256 |

* cited by examiner

*Primary Examiner*—James Hook
(74) *Attorney, Agent, or Firm*—Tim Headley; Gardere Wynne Sewell LLP (57) ABSTRACT

A perforated plate flow conditioner includes a single acoustic feedback interference device having an upstream end attached to a downstream side of the perforated plate. The upstream end covers substantially all of the downstream side of the perforated plate between two adjacent holes. The volume of a downstream end of the interference device is less than the volume of the upstream end. In another embodiment of the invention, the upstream end of a single acoustic feedback interference device covers substantially all of the spaces between a central hole and all of the surrounding adjacent holes. In another embodiment of the invention, all of the spaces between adjacent holes are substantially covered by upstream ends of acoustic feedback interference devices.

11 Claims, 9 Drawing Sheets

SILENCER FOR PERFORATED PLATE FLOW CONDITIONER

CROSS-REFERENCES TO RELATED APPLICATIONS

This application claims the benefit of U.S. Provisional Application No. 60/553,952, filed on Mar. 18, 2004.

STATEMENT REGARDING FEDERALLY SPONSORED RESEARCH OF DEVELOPMENT

Not applicable.

FIELD OF THE INVENTION

The present invention relates to pipeline perforated plate noise elimination generally, and in particular relates to the elimination of noise generated by the special application of a perforated plate flow conditioner to assist in flow measurement.

BACKGROUND OF THE INVENTION

Specially devised screens are used in the pipeline industry to reconfigure the fluid flow profile in the pipeline. When used to correct the fluid flow profile in the pipe they are referred to as perforated plate flow conditioners. An example of such a flow conditioner is the invention described in U.S. Pat. No. 5,762,107, which is incorporated herein by this reference. That patent disclosed adding vanes parallel to the flow, both upstream and downstream to the perforated plate. Similarly, U.S. Pat. No. 6,701,963, which is incorporated herein by this reference, discloses a low pressure drop flow conditioner using porous axial vanes.

In operation the perforated plates are installed in the pipeline in front of the flow meter. The perforations (holes) in the plate cause the fluid flow to be reconfigured or readjusted in the radial directions so as to develop a fluid flow velocity profile which is preferred. In some cases this preferred fluid flow velocity profile can be that which is normally seen in a long straight piece of flowing pipe, or can be of a condition which is simply repeatable (can be exactly recreated time after time). The net positive effects of the flow conditioning device is that the flow meter which is located downstream of the flow conditioner operates in a more accurate and repeatable fashion. There are numerous perforated plates used in industry some patented, some public domain. Noise generation is a detrimental aspect of perfroated plates.

When fluid flows past a perforated plate, which can be a disk containing holes of any type of diameter, array, or configuration, noise is generated. The noise generation is a normal physical characteristic of the fluid flow case, but it is a detrimental attribute which can in some cases offset the positive measurement effects of the perforated plate flow conditioner.

The undesirable noise is generated by harmonic interaction between the hole, fluid jets downstream of the screen, a flat spot of the plate on a rear section between the holes, and the location of the impact point of the fluid jets, which is a coalescing point. The physics of noise generation can be understood by reference to one hole pair and the "flat spot" between the two holes. The flow conditioner can be made of any number of holes. At least one hole pair and the accompaning rear flat spot between the holes create the noise phenonenom.

Referring now to FIG. 1(a)–(e), a prior art perforated plate flow conditioner 9 has holes 10. As fluid passes through the holes 10, each hole initiates a high speed stream 11 of fluid at an initiation point, which is the upstream hole inlet edge 12. Prior attempts to solve the noise phenomenon focused efforts at the upstream hole inlet edge 12, but with only marginally successsful results, because the fundamental physcial noise generation phenomenon downstream of the perforated plate was overlooked.

As fluid travels through each hole 10, the fluid accelerates and develops the stream 11 which is bounded by the inside walls of the hole. Upon exit from the hole the fluid streams 11 expand to meet the pipe flow conditions downstream. Exit vortices are generated as the streams 11 exit from the flow conditioner. If the expanding streams 11 are exiting adjacent holes, the point where the adjacent exiting streams touch is a coalescing point 14. The vortices contained within the exiting streams 11 are dynamic in nature, and can therefore generate some acoustic noise of a frequency dependent on the hole diameters and the distance between the holes.

Figure 1A:
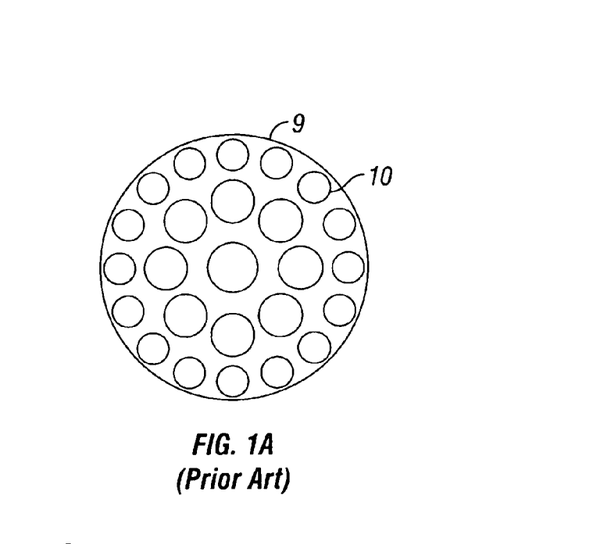
FIG. 1(a) illustrates a plan view of the upstream side of a prior art perforated plate flow conditioner.
Figure 1B:
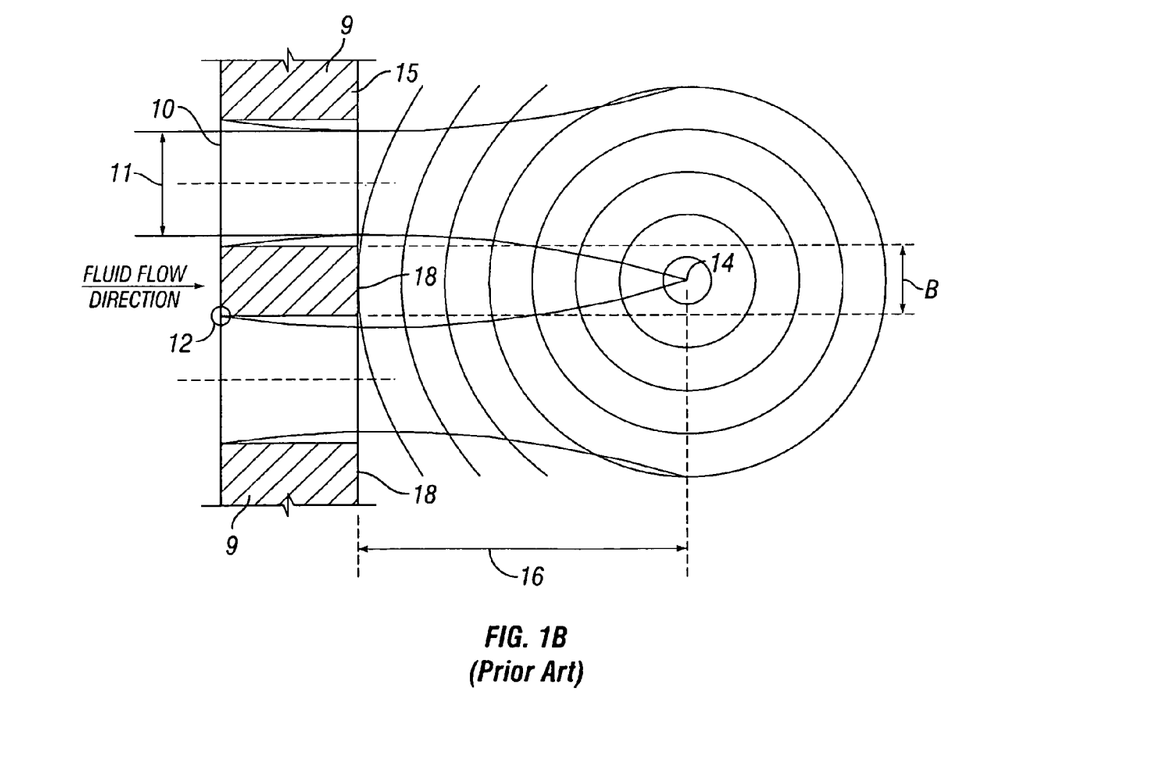
FIG. 1(b) illustrates fluid streams through the plate of FIG. 1(a), and the acoustic noise generated by the fluid streams.
Figure 1C:
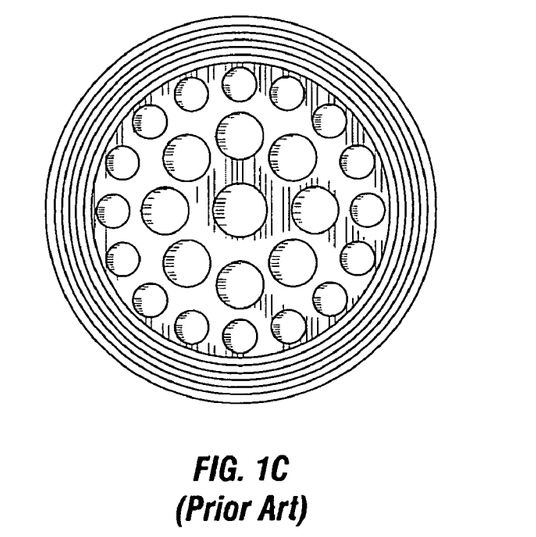
FIG. 1(c) illustrates a plan view of the downstream side of a prior art perforated plate flow conditioner.
Figure 1D:
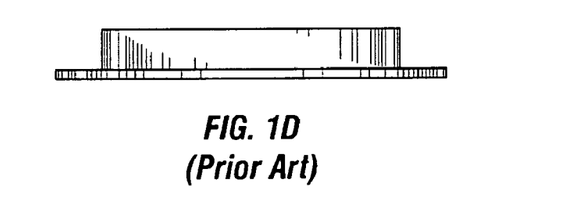
FIG. 1(d) illustrates a side view of the downstream side of the perforated plate flow conditioner of FIG. 1(c).
Figure 1E:
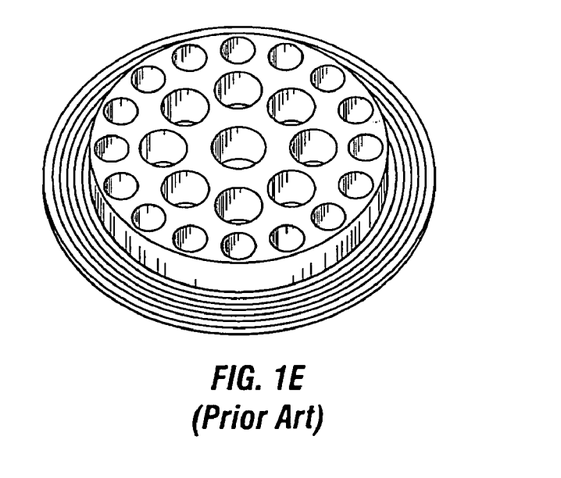
FIG. 1(e) illustrates a perspective view of the downstream side of the perforated plate flow conditioner of FIG. 1(c).
Figure 1F:
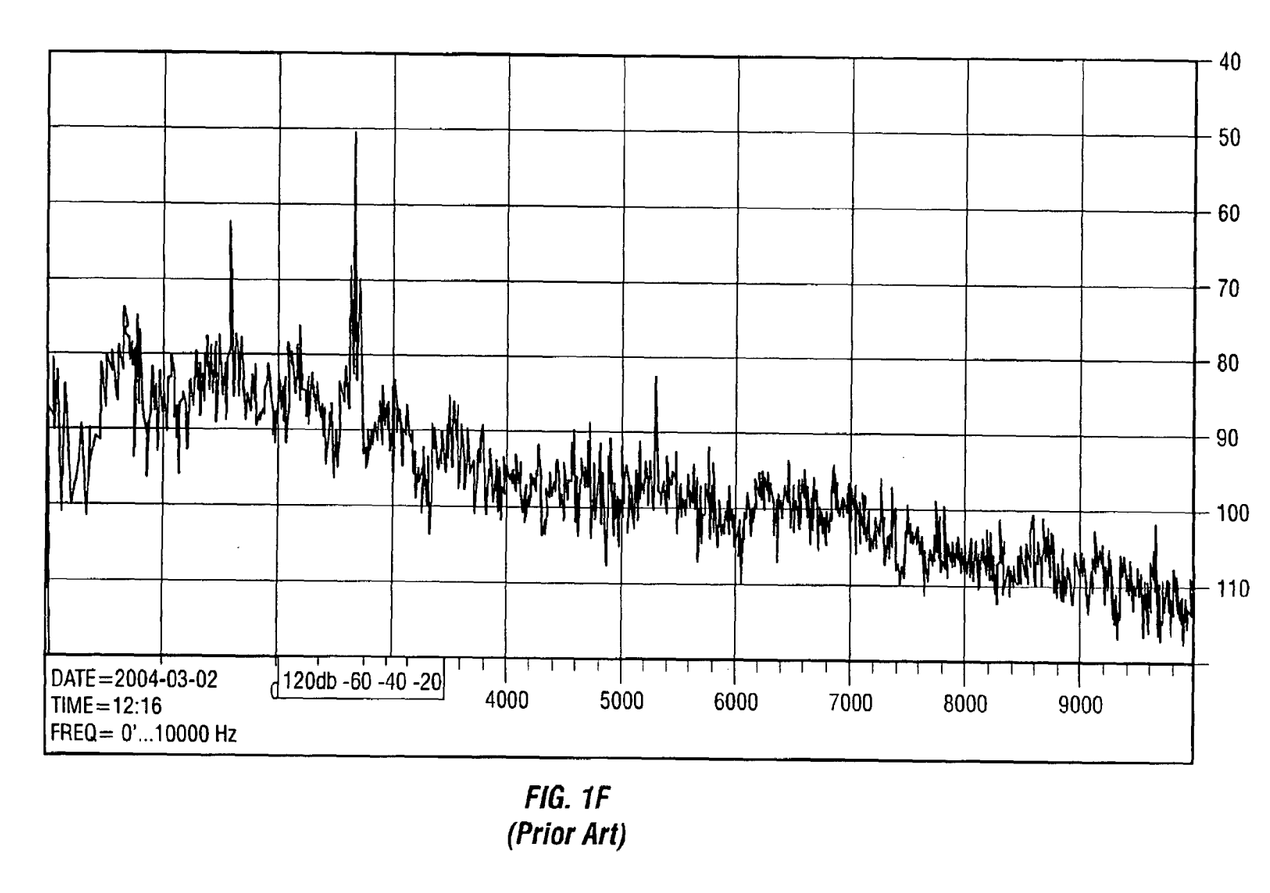
FIG. 1(f) illustrates the measurement of the noise generated by fluid flowing through the plate of FIG. 1(c).

From a downstream side 15 of the perforated plate flow conditioner 9 to the coalescing point 14 is a distance 16 which is a function of, and is dependent on, the fluid flow velocity and the diameter of the stream 10. At the coalescing point 14 some small amount of acoustic energy is generated from the contacting jets. When the distance 16 is at some whole number product of the wavelength distance of the acoustic emmitance of the coalescing point 14, acoustic resonance occurs. The accoustic energy from the coalescing point 14 feeds back to a downstream side 15 flat spot 18 between holes, where it is reflected back to coalescing point 14, but it also disturbs the jet vortices at the hole exit location. The disturbed jets meet at the coalescing point 14, then emit acoustic energy, and the cycle continues. This feedback cycle continues until the acoustic energy becomes detrimental noise, as shown in FIG. 1(f). This noise is detrimental to flow meter performance and is environmentally unacceptable.

Thus, flowmeters such as disclosed in U.S. Pat. No. 6,647,806, which is incorporated herein by this reference, which use a turbulence conditioner for use with transit time ultrasonic flowmeters, suffer from decreased performance due to the noise generated by the flow conditioner.

Numerous patented and unpatented perforated plate flow conditioners, and other types of devices which are used to modify flow in pipe for fluid flow measurment (not all flow conditioning devices are perforated plates) are produced by the following companies:

Akashi
AMCA
Bellinga
Bosch & Herbrard
Gallagher (Savant Measurement)
ISO
K-Lab

Figure 1G:
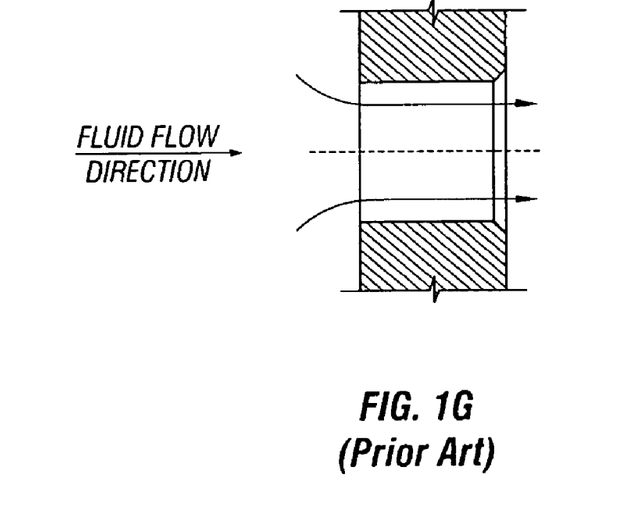
FIG. 1(g) illustrates a side view of a prior art perforated plate flow conditioner, having a downstream backward chamfered hole.
Figure 1H:
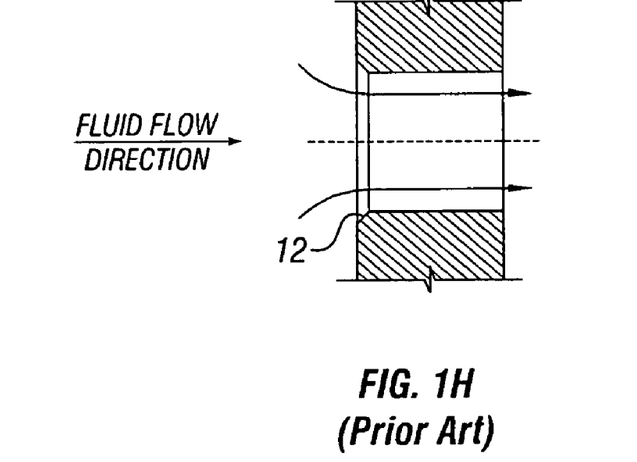
FIG. 1(h) illustrates a side view of a prior art perforated plate flow conditioner, having a upstream forward chamfered hole.

Kinghorn
Laws (Elizabeth M. Laws)
K-Lab (Statoil Norway)
Mitsubishi
CPA 50E (NOVA 50E)
Gas DeFrance
PG&E (John Stuart)
Sens & Teule
Spearman
Sprenkle
Stuart C-3
Vortab
Zanker Attempts to modify the generation of perforated plate noise by modifying the edge sharpness at the upstream hole inlet edge 12, as shown in FIG. 1(h), have been the only noise elimination attempted solutions to date. Effectiveness of this approach has been only marginal, because the modification of edge sharpness at the hole inlet edge 12 simply changes the distance 16, thereby changing the harmonics acoustic noise generation feedback system—the location of the coalescing point 14 and the wavelength of the emitted noise. When the pipe fluid velocity happens to make the acoustic wavelength equal to the distance 16, noise is again emitted,.although at a new frequency which may not be as detrimental.

Previous attempts to silence perforated plate noise have been only partly successful:

"Whistling Flow Straighteners and their influence on Ultrasonic Flow Meter Accuracy. Authors Dr. H. J. Riezebos, Gasunie, Netherlands, Ing. J. P. Mulder, Gasunie, Netherlands, Ir G. H. Sloet, Gasunie, Netherlands, Ing R, Zwart, Gasunie, Netherlands. In this methodology the researchers focused on only the leading and trailing hole edge contours of the perforated plate. Some reductions in noise pressure level were achieved, but the fundamental noise generation mode is still operationally unabated.

U.S. patent application Ser. 20040055816 by James Gallagher et al., published Mar. 25, 2004, which is incorporated herein by this reference, discloses an apparatus for filtering ultrasonic noise within a fluid flow system. The application states, "the noise filter 410 provides an absorbent element having absorbent material thereon which converts indirect noise propagation into vibration (and, also thereby converting the indirect noise energy into small amounts of thermal energy). The device appears to be similar to a packed muffler, and the absorbent material has apparently had longevity problems.

U.S. Pat. No. 6,533,065 to Zanker, which is incorporated herein by this reference, discloses a noise silencer for use with an ultrasonic meter. The silencer comprises a tubular body having at least two baffles spaced apart from one another. The baffles are preferably formed of an open-cell, reticulated metal foam material that absorbs noise in the ultrasonic range of frequencies under high-pressure operating conditions. However, this silencer, in addition to being expensive, is passive, and converts the noise generated into heat after the fact. That is, it does not deal with the source of the problem. This silencer is prone to self-destruction because the gas velocities in the pipe are large, and damage protruding devices like this device. Finally, this silencer creates a high pressure drop.

Blaine Sawchuk, one of the inventors of the present invention, and Wayne Haner of Winnepeg, Manitoba, Canada, developed various hole edge configurations on perforated plates. Chamfering the downstream edge of the hole 11, as shown in FIG. 1(g), did nothing to noise elimination. Chamfering the upstream hole inlet edge 12, as shown in FIG. 1(h), reduced the flow conditioner noise slightly. Rounding the leading edge of the perforated plate holes increased the noise generation significantly.

Currently, no device exists to eliminate the source of the noise where it is generated: at the flat spots 18 between the holes on the downstream side 15, thus interfering with the acoustic feedback loop. What is needed is a device that eliminates the flat spots 18.

SUMMARY OF THE PRESENT INVENTION

The present invention provides a perforated plate flow conditioner comprising a single acoustic feedback interference device having an upstream end attached to a downstream side of the perforated plate. The upstream end covers substantially all of the downstream side of the perforated plate between two adjacent holes. The volume of a downstream end of the interference device is less than the volume of the upstream end. In another embodiment of the invention, the upstream end of a single acoustic feedback interference device covers substantially all of the spaces between a central hole and all of the surrounding adjacent holes. In another embodiment of the invention, all of the spaces between adjacent holes are substantially covered by upstream ends of acoustic feedback interference devices.

DETAILED DESCRIPTION

Figure 2A:
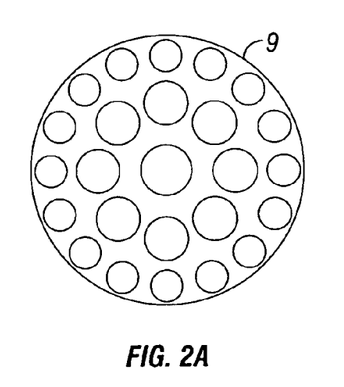
FIG. 2(a) illustrates a plan view of the upstream side of a perforated plate flow conditioner, built according to the present invention.
Figure 2B:
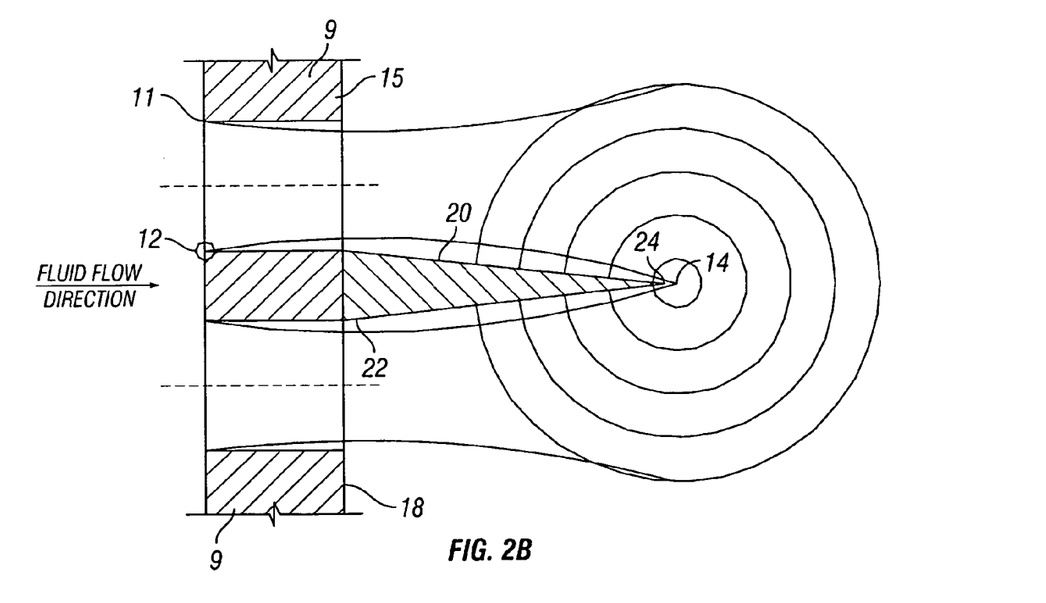
FIG. 2(b) illustrates a side view of the plate of FIG. 2(a), showing a single cone covering substantially all of a downstream spot between two holes of the plate, fluid streams through the two holes, and the acoustic noise generated by the fluid streams.

Referring now to FIG. 2, a perforated plate flow conditioner 9 includes a single solid conical acoustic feedback interference device 20 having an upstream end 22 rigidly attached to the downstream side 15 of the perforated plate flow conditioner 9. The upstream end 22 covers substantially all of the the flat spot 18 between two adjacent holes on the downstream side 15. The volume of a downstream end 24 of the acoustic feedback interference device is less than the volume of the upstream end 22. In a preferred embodiment, the acoustic feedback interference device 20 has a conical shape. However, the axial cross-sectional view of the acoustic feedback interference device 20 can also have a rectangular or cylindrical shape. In the preferred embodiment, the distance 26 between the upstream end 22 and the downstream end 24 is 0.362 of the diameter of the perforated plate flow conditioner 9.

Referring now to FIG. 3, in an alternate embodiment, the perforated plate flow conditioner 9 includes a single hollow conical acoustic feedback interference device 20, positioned around a central hole 11. The upstream end 22 covers substantially all of the flat spots 18 on the downstream side 15 between the central hole 11 and all of the surrounding adjacent holes 11.

Figure 3A:
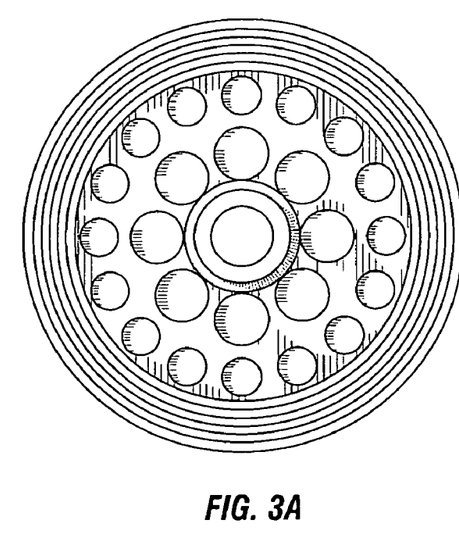
FIG. 3(a) illustrates a plan view of the downstream side of a perforated plate flow conditioner, built according to the present invention, and having a cone surrounding a central hole of the plate, and covering substantially all of the downstream areas between the central hole and the holes surrounding the central hole.

As in the embodiment shown in FIG. 2, the length 26 between the upstream end 22 and the downstream end 24 is less than 0.3 of the diameter of the perforated plate flow conditioner 9, and is preferably 0.2 of the diameter. The inside diameter of the hollow conical acoustic feedback interference device 20 is substantially the same throughout its length as the diameter of the central hole 11. However, the device 20 being conical in shape, the circumference of the downstream end is less than the circumference of the upstream end. As a result,the upstream end is substantially thicker than the downstream end.

Referring now to FIG. 4, (a)–(c), in the preferred embodiment of the present invention, hollow conical acoustic feedback interference devices 20 surround each of the holes 11. The "moutainous" appearance of the devices 20 is due to the intersection of the devices 20, which are applied to each downstream side flat spot 18 between the holes 11, where the flat spots 18 are of various sizes.

Figure 4A:
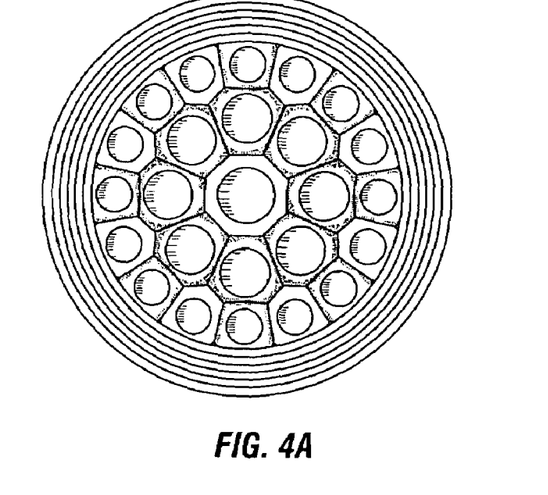
FIG. 4(a) illustrates a plan view of the downstream side of a perforated plate flow conditioner, built according to the present invention, and having cones surrounding each hole of the plate, and covering substantially all of the downstream areas between the holes.

As in the embodiment shown in FIG. 2, the lengths 26 between the upstream end 22 and the downstream end 24 is less than 0.3 of the diameter of the perforated plate flow conditioner 9, and is preferably 0.2 of the diameter. The inside diameters of the hollow conical acoustic feedback interference devices 20 are substantially the same as the diameter of the holes 11.

Operating Test Results

Figure 3B:
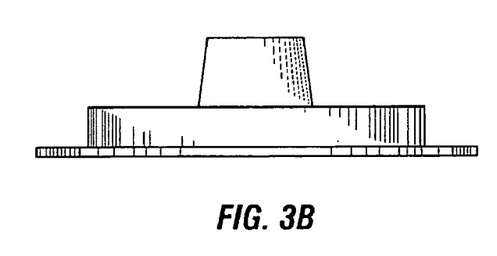
FIG. 3(b) illustrates a side view of the downstream side of the perforated plate flow conditioner of FIG. 3(a).
Figure 3C:
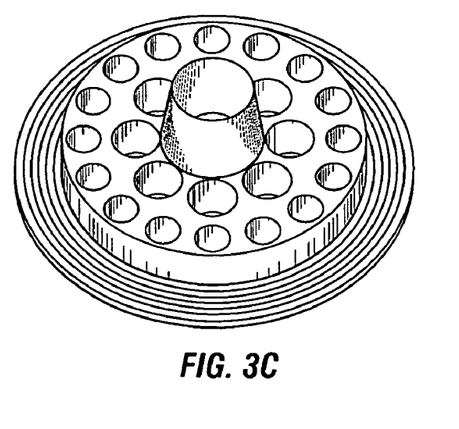
FIG. 3(c) illustrates a perspective view of the downstream side of the perforated plate flow conditioner of FIG. 3(a).
Figure 3D:
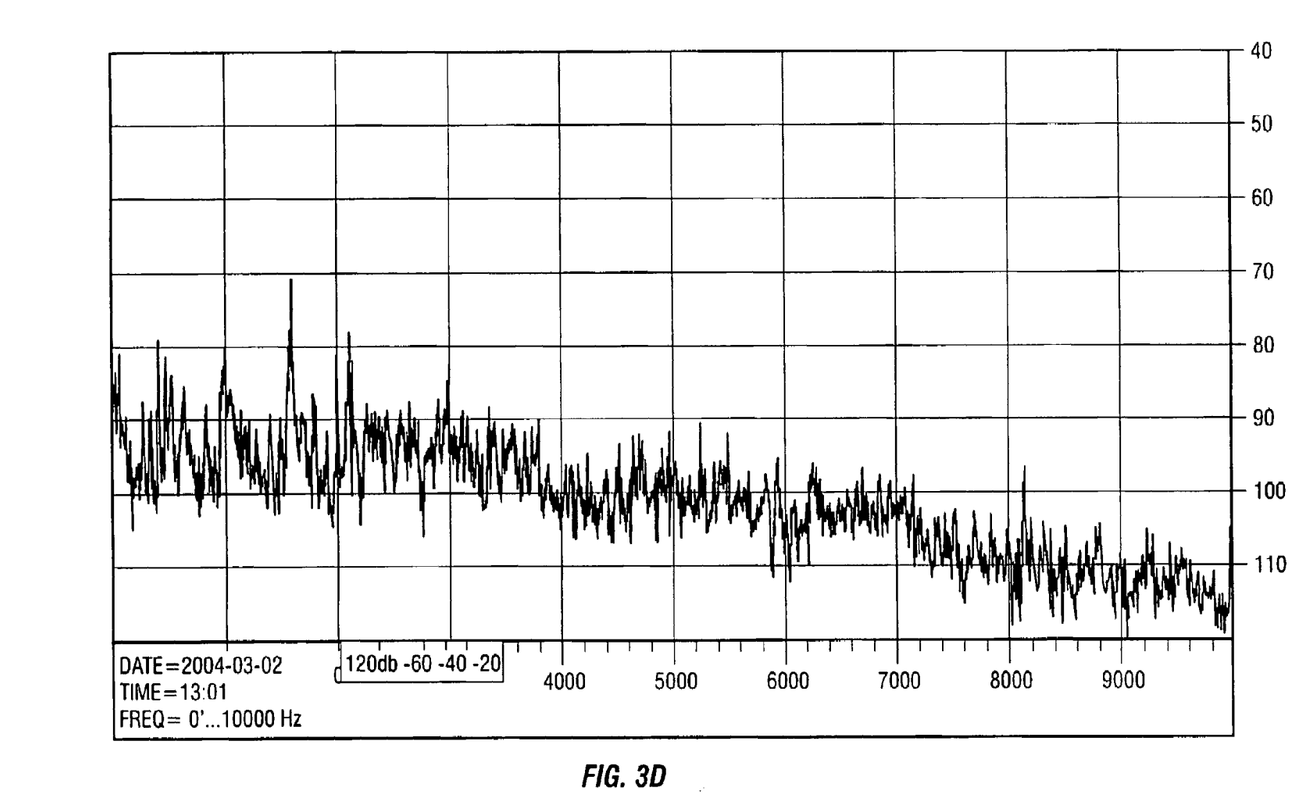
FIG. 3(d) illustrates the measurement of the noise generated by fluid flowing through the plate of FIG. 3(a).
Figure 4B:
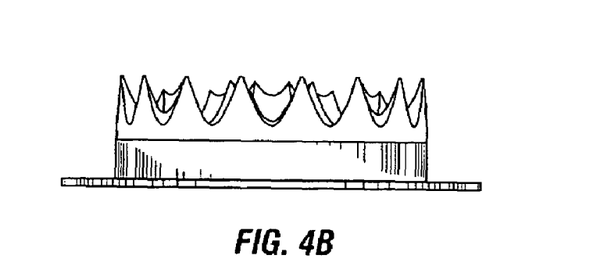
FIG. 4(b) illustrates a side view of the downstream side of the perforated plate flow conditioner of FIG. 4(a).
Figure 4C:
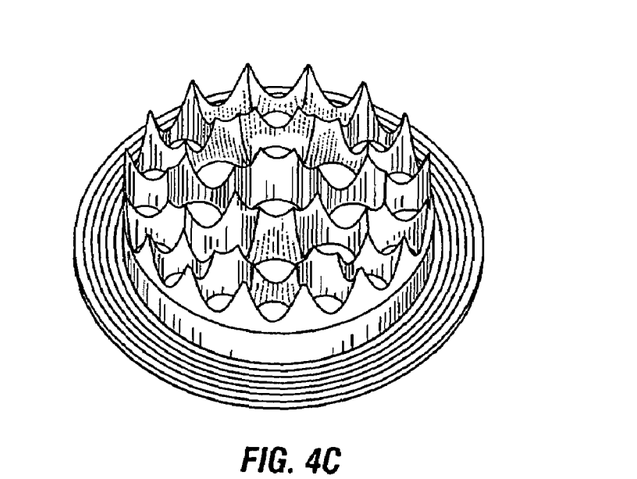
FIG. 4(c) illustrates a perspective view of the downstream side of the perforated plate flow conditioner of FIG. 4(a).
Figure 4D:
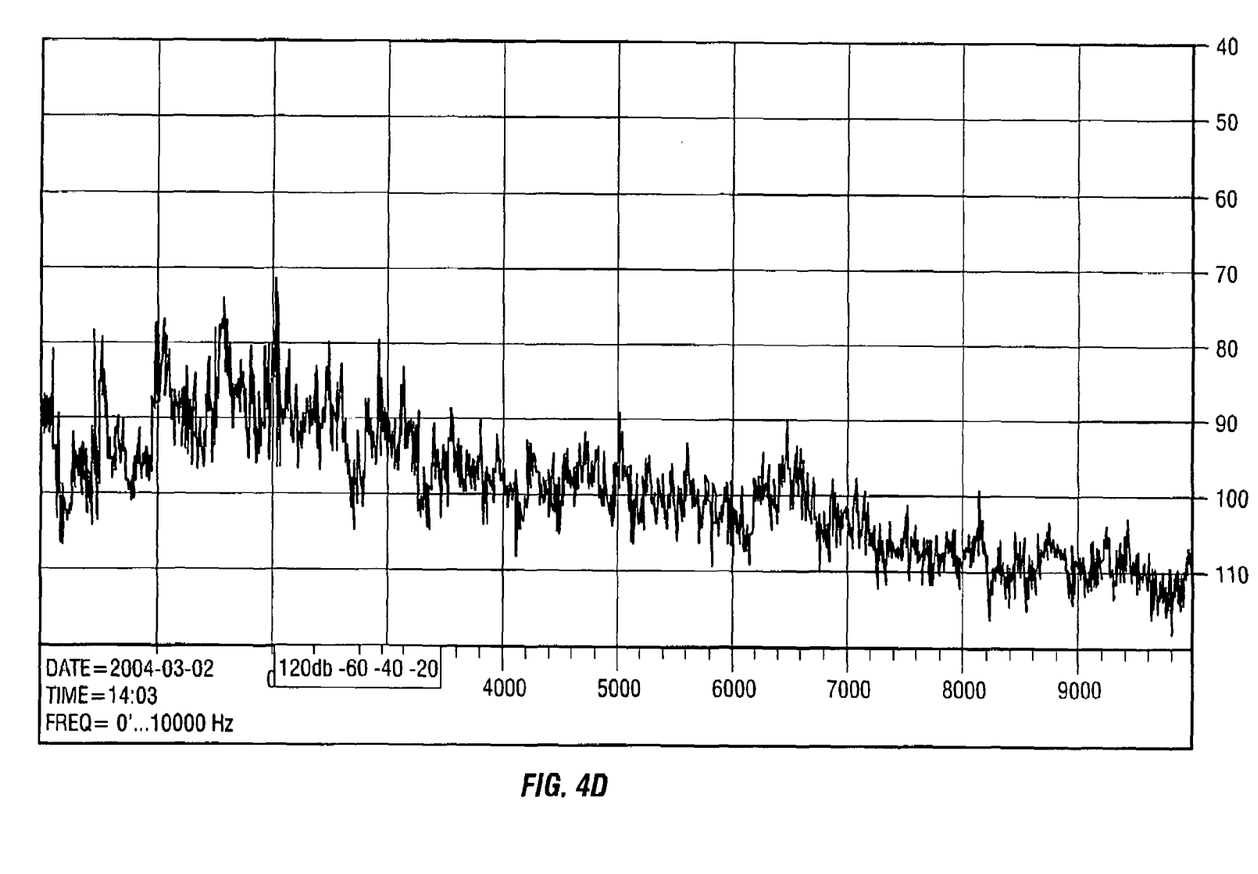
FIG. 4(d) illustrates the measurement of the noise generated by fluid flowing through the plate of FIG. 4(a).

The graphs indicated in FIG. 1(f) (prior art), FIG. 3(d), and FIG. 4(d) are the sound pressure levels, or noise, experienced outside of the perforated plates for various configurations for sound frequencies ranging from 0 to 10,000 hz. These are Fast Fourier Transforms. The gas flow rate was 85 ft/sec. The total broadband noise at this snapshot of time was 87 dB. The installation was 745 psi natural gas flowing at the TransCanada Calibrations Test facility located in Winnepeg, Manitoba, Canada. The tests were conducted Mar. 2, 2004. The snap shot was taken at the worst case of audible noise. The microphone was located downstream from the perforated plate flow conditioner. The location distance was measured at a 45 degree angle from the flow direction, and was approximately one meter.

Referring now to FIG. 1(f), this graph was the noise measured for the prior art perforated plate flow conditioner 9. The "peaks" at approximately 1600 hz, 2700 hz and 3200 hz represent the undesirable noise that needed to be eliminated.

Referring now to FIG. 3(d), this graph was the noise measured for the perforated plate flow conditioner 9 shown in FIG. 3(a)–(c). As can be seen from the graph, the perforated plate flow conditioner 9 shown in FIG. 3(a)–(c) eliminated the 2700 hz and the 3100 hz noise, and reduced background broadband noise to 71 db.

Referring now to FIG. 4(d), this graph was the noise measured for the perforated plate flow conditioner 9 shown in FIG. 4(a)–(c). As can be seen from the graph, the perforated plate flow conditioner 9 shown in FIG. 4(a)–(c) eliminated the noise at 1600 hz, 2700 hz and 3200 hz., and reduced background broadband noise reduced to virtual silence. The measured background noise was merely 60 db, which was produced by the building fans and HVAC equipment. No noise that was measured was actually coming from the perforated plate flow conditioner.

The invention claimed is:
1. A perforated plate flow conditioner comprising:
   a. a plurality of holes;
   b. a downstream side; and
   c. at least one acoustic feedback interference device having an upstream end and a downstream end, the upstream end attached to the downstream side; wherein the upstream end covers substantially all of the downstream side of the perforated plate between two adjacent holes, but does not cover any holes, and wherein the acoustic feedback interference device is selected from the group consisting of solid cones, solid cylinders, and solid rectangular beams.

2. The perforated plate flow conditioner of claim 1, wherein the distance between the upstream end and the downstream end is less than 0.3 of the diameter of the perforated plate flow conditioner.

3. The perforated plate flow conditioner of claim 1, wherein the distance between the upstream end and the downstream end is 0.2 of the diameter of the perforated plate flow conditioner.

4. A perforated plate flow conditioner comprising:
  a. a central hole and a plurality of surrounding holes;
  b. a downstream side;
  c. a single hollow acoustic feedback interference device having an upstream end and a downstream end, the upstream end attached to the downstream side; wherein the upstream end covers substantially all of the space between the central hole and all of the surrounding holes on the downstream side, but does not cover any holes, and wherein the acoustic feedback interference device is selected from the group consisting of solid cones, solid cylinders, and solid rectangular beams.

5. The perforated plate flow conditioner of claim 4, wherein the circumference of the downstream end is less than the circumference of the upstream end.

6. The perforated plate flow conditioner of claim 4, wherein the distance between the upstream end and the downstream end is less than 0.3 of the diameter of the perforated plate flow conditioner.

7. The perforated plate flow conditioner of claim 4, wherein the distance between the upstream end and the downstream end is 0.2 of the diameter of the perforated plate flow conditioner.

8. A perforated plate flow conditioner comprising:
  a. a plurality of holes;
  b. a downstream side;
  c. hollow acoustic feedback interference devices having upstream ends and downstream ends, the upstream end of each device attached to the downstream side; wherein each upstream end covers substantially all of the spaces between adjacent holes on the downstream side, but does not cover any holes, and wherein the acoustic feedback interference device is selected from the group consisting of solid cones, solid cylinders, and solid rectangular beams.

9. The perforated plate flow conditioner of claim 8, wherein the circumferences of the downstream ends are less than the circumferences of the upstream ends.

10. The perforated plate flow conditioner of claim 8, wherein the distance between the upstream ends and the downstream ends are less than 0.3 of the diameter of the perforated plate flow conditioner.

11. The perforated plate flow conditioner of claim 8, wherein the distances between the upstream ends and the downstream ends are 0.2 of the diameter of the perforated plate flow conditioner.

* * * * *